UNITED STATES PATENT OFFICE 2,555,499

PROCESS FOR TREATING BEESWAX

Louis Evan Minor, Smithville, Ontario, Canada

No Drawing. Application September 30, 1948,
Serial No. 52,141. In Canada January 3, 1948

7 Claims. (Cl. 260—420)

This invention relates to a process for treating beeswax and has special reference to a process for removing certain deleterious ingredients from crude beeswax.

Beeswax as ordinarily made by the bees contains a considerable quantity of acids and rosins which interfere with the plasticity of the beeswax and thus prevents the molding of such articles as comb foundations and the like.

Moreover the presence of such acids and rosins interferes with the durability of articles made from crude beeswax.

One important object of the invention is to provide a novel process for treating beeswax and removing unwanted acids and rosins therefrom so that the beeswax will have the maximum of proper plasticity to enable its being molded into comb foundations and other articles.

A second important object of the invention is to so treat crude beeswax as to remove those deleterious ingredients which hinder the uniformity and durability of crude wax, the process being such as to leave the wax free from these ingredients.

With the above and other objects in view as will be hereinafter apparent, the invention consists in general of certain novel steps in a process for treating beeswax, these steps being hereinafter fully described, and particularly pointed out in the appended claims.

In the treatment of beeswax under this process crude beeswax is melted in a tank or other receptacle containing water, the water being heated to such temperature as to melt the wax. This may be done by steam or direct heat or over a sand bath or the like. When the wax is melted it will float on top of the water. When thus prepared for other steps in the treatment carbon dioxide gas is blown through the mixture or rather the water and the wax floating thereon for a considerable period of time which will vary in accordance with the character of the crude wax. During the treatment with the carbon dioxide the stirred up mass is tested from time to time with the usual litmus test until the test indicates that the acids and rosins of the beeswax have been entirely separated from the supernatant wax.

At this time, in one manner of conducting the process the beeswax and water is allowed to stand in a quiet melted state whereupon the heavier acids and rosins will settle to the bottom of the receptacle in which the treatment so far has been accomplished.

When the impurities are settled the water with the wax floating thereon may be decanted or drawn off from the receptacle, or the acids and rosins may be drawn off from the bottom until clear water floats from the drawn off opening.

This latter method may be continued until all the water has been drawn off, leaving the purified beeswax in the receptacle which may then be allowed to cool so that the wax will solidify and then be removable from the receptacle. In the case where the beeswax is decanted care may be taken to have little of the water decanted along with the floating beeswax and the wax allowed to cool in contact with the water remaining after decantation.

When solidified under the last conditions the wax is readily removed from contact with the water.

As another method of carrying out the process, after the step of treating with carbon dioxide, as set forth above, supplemental steps may be employed. In this supplemental step a small amount of alkali, an active alkali, such as potassium hydroxide or the like being preferably employed is added to and completely mixed with the contents of the tank. The amount of the alkali used in such a case will depend on the color and properties of the crude beeswax but the amount in any case will be very small in proportion to the quantity of the beeswax. For instance, one may dissolve about an ounce of the alkali used in an aqueous solution of alcohol and then add the solution to 100 lbs. of the crude beeswax. When carrying out the form of process wherein alkali is used the following steps are the same as where no alkali is used.

When treated in this manner the resultant purified beeswax is highly plastic and is especially well adapted for the making of comb foundations. Furthermore, foundations made from this purified beeswax can be worked with greater ease and more readily by the bees in completing the comb. In addition to this the combs thus made are more durable and are free from being attacked and destroyed by the moth known as a wax moth, such destruction being very prevalent where material or crude beeswax is used in the combs.

Of course since the purified wax has this greater plasticity and durability it is well adapted for use in other purposes than merely making the foundation units for combs.

It is to be particularly observed that this treatment does not injure the natural color, nor does it destroy the pleasing aroma of beeswax.

What is claimed is:

1. In a process of treating beeswax, the steps comprising melting untreated beeswax in a bath of water, blowing carbon dioxide gas through the bath and melted beeswax until the melted beeswax becomes substantially neutral as indicated by testing with litmus.

2. In a process of treating beeswax, the steps comprising melting beeswax in a bath of water, blowing carbon dioxide gas through the bath and melted beeswax until the melted beeswax becomes substantially neutral as indicated by testing with litmus, permitting freed impurities to settle, and separating the impurities from the treated beeswax.

3. In a process of treating beeswax, the steps comprising melting untreated beeswax in a bath of water, blowing carbon dioxide gas through the bath and melted beeswax until the melted beeswax becomes substantially neutral as indicated by testing with litmus, and adding to the beeswax a small proportion of active alkali.

4. In a process of treating beeswax, the steps comprising melting untreated beeswax in a bath of water, blowing carbon dioxide gas through the bath and melted beeswax until the melted beeswax becomes substantially neutral as indicated by testing with litmus, and adding to the beeswax active alkali in amount of approximately one ounce of active alkali to one hundred pounds of wax.

5. In a process of treating beeswax, the steps comprising melting untreated beeswax in a bath of water, blowing carbon dioxide gas through the bath and melted beeswax until the melted beeswax becomes substantially neutral as indicated by testing with litmus, and adding to the beeswax a small proportion of potassium hydroxide.

6. In a process of treating beeswax, the steps comprising melting untreated beeswax in a bath of water, blowing carbon dioxide gas through the bath and melted beeswax until the melted beeswax becomes substantially neutral as indicated by testing with litmus, allowing the beeswax and bath of water to stand in quiescent condition until freed impurities settle whereby same can readily be separated from the beeswax.

7. A process of treating beeswax to neutralize and remove deleterious substances occurring in untreated beeswax, comprising treating beeswax in contact with a water bath, with carbon dioxide gas and active alkali, said beeswax being treated to melting temperature, said carbon dioxide gas being introduced continuously into the beeswax, and said active alkali being added in small proportion based on the amount of beeswax, said treatment being continued until the beeswax becomes substantially neutral as indicated by testing with litmus.

LOUIS EVAN MINOR.

REFERENCES CITED

The following references are of record in the file of this patent:

UNITED STATES PATENTS

| Number | Name | Date |
|---|---|---|
| 1,264,186 | Holliday | Apr. 30, 1918 |
| 1,368,148 | Heyerdahl | Feb. 8, 1921 |
| 2,037,111 | Bisson et al. | Apr. 14, 1936 |
| 2,269,667 | Kauffmann | Jan. 13, 1942 |

OTHER REFERENCES

Lewkowitsch: Chem. Tech. and Analysis of Oils, Fats and Waxes, vol. II (1922), MacMillan & Co., Ltd., pages 30–31.